UNITED STATES PATENT OFFICE.

WILLIAM SLEEPER, OF GOSHEN, INDIANA, ASSIGNOR OF ONE-HALF TO LLEWELLYN WANNER, OF SAME PLACE.

WATER AND FIRE PROOF ROOF-PAINT.

SPECIFICATION forming part of Letters Patent No. 255,041, dated March 14, 1882.

Application filed January 16, 1882. (No specimens.)

*To all whom it may concern:*

Be it known that I, WILLIAM SLEEPER, a citizen of the United States, residing at Goshen, in the county of Elkhart and State of Indiana, have invented certain new and useful Improvements in Water and Fire Proof Roof-Paint; and I do hereby declare that the following is a full, clear, and exact description of the same.

The object of the present invention is to produce a paint for roofs and other purposes which will not wash off or discolor water, and is a sure protection against fire-brands or sparks, and perfectly impervious to water, and can be applied on either shingles, tin, or any other kind of roof, will adhere firmly, and successfully withstand heat or cold and all kinds of weather.

The composition of my water and fire proof paint is made up of the following ingredients, and in about the proportions hereinafter named: boiled linseed-oil, two and one-half gallons; Venetian red, forty pounds; plaster-of-paris, fifteen pounds; coal-tar, forty gallons; japan, five gallons; shellac, three gallons; asbestus, fifteen pounds. The boiled linseed-oil gives elasticity to the paint and prevents cracking and scaling off. The Venetian red gives it body and color. The plaster-of-paris and shellac give it toughness and a hardening quality. The japan exhausts the moisture and acts as a drier. The asbestus renders it a protection against fire; and all the above ingredients mixed with the coal-tar in substantially the proportions stated form a new compound in paints, giving it body, toughness, elasticity, durability, color, and impermeable and fire-proof properties, making it a paint of superior worth and merit.

In compounding the ingredients, first mix well the boiled linseed-oil, Venetian red, shellac and japan, after which pour the same into the coal-tar and apply the plaster-of-paris and asbestus, and then stir well and thoroughly mix the paint, when it is ready for use.

I do not desire to be understood as limiting myself to the exact proportions named, as the quantity of the ingredients may be more or less in certain cases where circumstances require such change.

I am aware that asbestus, oil, and pigments have been used as a compound for paint; also, that asbestus has been used in connection with mineral pitch and prepared silica; also, it has been combined with a mixture of lime and water. I therefore do not desire to be understood as claiming broadly any of the above ingredients, either separately or combined, as above stated, to produce a fire and water proof paint; but, Having fully described my invention, what I do claim as new, and desire to secure by Letters Patent, is—

A water and fire proof paint consisting of the following ingredients: boiled linseed-oil, Venetian red, plaster-of-paris, coal-tar, shellac, japan, and asbestus, substantially in the proportions named.

In testimony that I claim the above I have hereunto subscribed my name in the presence of two witnesses.

WILLIAM SLEEPER.

Witnesses:
  THO. GILFILLAN,
  WILLIAM N. RENTFROU.